United States Patent [19]

Scheffel et al.

[11] 4,005,753

[45] Feb. 1, 1977

[54] METHOD OF TREATING A SUBTERRANEAN FORMATION WITH A POLYMERIC DIVERTING AGENT

[75] Inventors: John W. Scheffel, Fullerton; Paul W. Fischer, Whittier, both of Calif.

[73] Assignee: Union Oil Company of California, Brea, Calif.

[22] Filed: Mar. 4, 1976

[21] Appl. No.: 663,989

Related U.S. Application Data

[62] Division of Ser. No. 475,511, June 3, 1974, Pat. No. 3,954,629.

[52] U.S. Cl. .............................. 166/283; 166/295; 166/282; 166/308; 175/72
[51] Int. Cl.² .................. C09K 7/02; E21B 33/138; E21B 43/26
[58] Field of Search .......... 166/295, 283, 281, 282, 166/308; 175/65, 72

[56] References Cited

UNITED STATES PATENTS

| | | | |
|---|---|---|---|
| 3,302,719 | 2/1967 | Fischer | 166/280 |
| 3,455,390 | 7/1969 | Gallus | 166/295 |
| 3,593,794 | 7/1971 | Fischer et al. | 166/283 |
| 3,630,280 | 12/1971 | Fischer et al. | 166/295 X |
| 3,684,012 | 8/1972 | Scheffel et al. | 166/295 X |
| 3,717,204 | 2/1973 | Scheffel et al. | 166/295 |

*Primary Examiner*—Stephen J. Novosad
*Attorney, Agent, or Firm*—Richard C. Hartman; Dean Sandford; Gerald L. Floyd

[57] ABSTRACT

A water-insoluble particulate composition having controlled slow oil-solubility at temperatures in excess of 350° F. is disclosed. The composition is comprised of solid particles of a homogeneous mixture of (1) polyethylene, ethylene-vinyl acetate copolymer containing about 15 to 30 weight percent vinyl acetate, or admixtures of these polymers; (2) a polyamide having a melting point of between about 400° F. and 460° F.; and (3) a softening agent such as a long chain aliphatic diamide having a melting point between about 280° F. and 300° F., or a polyterpene resin having a melting point of between 230° F. and 275° F. Also disclosed is a method of using this particulate composition in well drilling and treating operations where formation temperatures of 350° F. or above are encountered.

8 Claims, No Drawings

METHOD OF TREATING A SUBTERRANEAN FORMATION WITH A POLYMERIC DIVERTING AGENT

This is a division of application Ser. No. 475,511, filed June 3, 1974 now U.S. Pat. No. 3,954,629.

BACKGROUND OF THE INVENTION

1. Field of the Invention

This invention relates to well drilling and treating, and more particularly to a method and composition for temporarily reducing the permeability of high-temperature, permeable oil-bearing formations.

2. Description of the Prior Art

In various well treating operations such as, for example, in the completion of wells in permeable hydrocarbon producing zones, and in stimulating the recovery of oil and gas from these producing zones, it is often advantageous to inject a fluid into the well in such a manner that the fluid is in contact with the earth formation penetrated by the well. However, in many instances, drilling muds, completion fluids, fracturing fluids, acid and other well treating liquids injected into the well bore preferentially flow into zones of high permeability, called thief zones. Not only does this result in loss of waste of the fluid, but also prevents the injected fluid from entering into the zones of lower permeability in substantial quantities, thus causing poor distribution between zones of different permeability. Accordingly, low fluid loss agents, and in particular plugging agents, have been developed for use in these applications. In the above-mentioned applications it is essential that the temporary fluid loss control or plugging agent be readily removed from the hydrocarbon producing zones to prevent permanent loss of permeability and an attendant reduction in oil production rate. Removal of the plugging agent may be effectively accomplished by utilizing an agent that is soluble in the formation hydrocarbons. However, many of the prior art materials are either insoluble under bottom hole conditions, or are so highly soluble they are difficult to place in the formation and fail to maintain the required plug during the treating operation. It is therefore essential that the fluid loss or plugging agent possess a property of controlled solubility wherein a satisfactory solid plug will be formed for a period of time and whereupon the plug will thereafter be removed by being slowly dissolved by the formation hydrocarbons.

It is also advantageous to utilize a material that is insoluble in water, thereby leaving any water producing strata permanently sealed. Thus, selective plugging is effected, the hydrocarbon-producing strata is temporarily plugged and the water-producing strata remaining permanently sealed. On removal of the temporary plugging agent from the hydrocarbon-producing strata, oil and gas production capability is fully restored, while water production is permanently eliminated or substantially decreased.

Each of the aforesaid well treating processes commonly requires a temporary plugging material capable of being formed into small solid particles of controlled size, preferably by an inexpensive technique. The material should be slowly soluble in the formation hydrocarbons and insoluble in water at formation conditions to accomplish the desired selective plugging and complete restoration of hydrocarbon permeability. Particle size is important in controlling the distance that the plugging agent penetrates into the formation and the degree of fluid shutoff obtained. Therefore, it is essential that a large number of particles do not agglomerate or stick together in the treating fluid to form clumps of widely varying dimensions during the treating operation. While other properties of the particulate agent may influence particle agglomeration, agglomeration is largely controlled by the tackiness of the particle surface. Hence, it is necessary that the plugging agent particles exhibit a low degree of tackiness on exposure to air at ambient temperatures, and also remain non-tacky or non-sticky upon exposure to formation hydrocarbons and to treating fluids. In addition, particles which are somewhat resilient possess superior plugging properties since they deform to effectively fill flow passages. Also, high mechanical and impact strength is desirable to avoid size reduction of individual particles by attrition. Various slowly oil-soluble, water-insoluble particulate agents useful in well drilling and treating operations have been developed. In particular, U.S. Pat. No. 3,316,965 discloses the use of homogeneous solid particles of non-gaseous hydrocarbons and polymers; U.S. Pat. No. 3,342,263 discloses the use of discrete solid particles of homogeneous solid mixtures of polymers and halogenated aromatic hydrocarbons melting above about 125° F.; U.S. Pat. No. 3,363,690 discloses the use of particles of homogeneous solid mixtures of a polymer and an alcohol melting above about 100° F.; U.S. Pat. No. 3,302,719 discloses solid particles comprised of a homogeneous mixture of polymer, wax and resin. While these compositions are satisfactory in many well-drilling and treating applications and their use has contributed greatly to increased oil-recovery, they have not been completely successful in the treatment of high-temperature subterranean formations. U.S. Pat. No. 3,717,204 discloses the use of solid particles of a homogeneous solid mixture of polymer, wax and a solubility retarding agent where formation temperatures are between 200° F. and 250° F. Suitable solubility retarding agents disclosed are selected from long-chain aliphatic hydrocarbons, aliphatic amides and oxidized hydrocarbon waxes melting at a temperature between about 250° F. and 325° F.

The bottom-hole temperature of a well varies with the geographical location of the well and with its depth. For example, many producing wells have bottom-hole temperatures between 125° F. and 155° F. Others may have bottom-hole temperatures of above 200° F., and often as high as 250° F. and above. The current demand for increased oil reserves has resulted in more deep well exploration and production activity. As wells get deeper, high bottom-hole temperatures in excess of 300° F. and often as high as 350° F. and above are encountered. In order that the treated wells can be returned to full production, the injected and temporary plugging or diverting agents must be soluble in the reservoir oil at that reservoir temperature to the extent that substantially all of the plugging agent is removed within a reasonably short time, such as between about 1 and 6 days after returning the well to production. Solid compositions that are completely solubilized by the reservoir oil in less than 12 hours or greater than 6 days have been found to be undesirable for many of the well-treating processes. Many of the compositions disclosed in the foregoing patents are satisfactory for the treatment of formations having temperatures below about 180° F., but are too soluble at higher temperatures to provide optimum treatment of a higher temperature formation. Even the compositions disclosed in U.S. Pat. No. 3,717,207 for treatment of formations having temperatures between 200° F. and 250° F. fail to provide an adequate plug for a sufficient period of time and do not possess the requisite properties of strength and non-tackiness in higher temperature formations. Thus, there exists a need for a particulate solid composition that has the characteristics of controlled slow oil solubility at high formation temperatures, and particularly at temperatures between about 350° F. and above, that is insoluble in water, and that exhibits other requisite properties of hardness, strength and non-tackiness.

SUMMARY OF THE INVENTION

This invention involves a novel composition and an improved well treating process for temporarily plugging high temperature subterranean formations having temperatures of 350° F. and above. The composition is comprised of solid particles of a homogeneous mixture of (1) about 5 to 25 weight percent of polyethylene or a copolymer of ethylene-vinyl acetate containing about 15 to 30 weight percent vinyl acetate, or admixtures of these polymers; (2) about 8 to 50 weight percent of a polyamide having a melting point between about 400° F. and 460° F. characterized by the formula:

where R is an alkyl group containing from 15 to 18 carbon atoms, $x$ is an integer from 2 to 4, and $y$ is an integer from 4 to 10; and (3) about 40 to 70 weight percent of a softening agent such as long chain aliphatic diamides having a melting point of between about 280° F. and 300° F. characterized by the formula:

where R' is an alkyl group containing from 15 to 17 carbon atoms and R'' is an alkylene group containing from 2 to 4 carbon atoms, or polyterpene resins having melting points of between about 230° F. and 275° F.

DESCRIPTION OF THE PREFERRED EMBODIMENTS

The particulate compositions of this invention are insoluble in water and slowly soluble in oil, and are particularly useful as fluid loss control agents and as diverting or plugging agents in treating and hydraulically fracturing subterranean earth formations having temperatures in excess of 350° F. penetrated by a well, and in the drilling of wells into such formations.

The oil-solubility of the particulate composition can be determined by intimately contacting the particles with a test solvent such as crude petroleum recovered from the oil-bearing formation to be treated, or a similar liquid solvent, maintained at the temperature of the formation. The particulate compositions of this invention are slowly soluble in oil at temperatures above 350° F. so that not more than 50 volume percent of the particles are dissolved by the oil during the first 18 hours of exposure to the oil, or at least 50 volume percent of the particles are dissolved during the time span between 18 and 72 hours of a 72-hour exposure period. Thus, the solid particulate composition can be employed in treating a wide-range of high temperature formations as the solid particles are substantially insoluble on contact with oil at temperatures below about 350° F. for a short period of time such as 18 hours and are completely dissolved or dispersed in the oil upon prolonged contact with temperatures above about 350° F. so that substantially no solid residue remains to plug the oil-bearing strata of the formation.

The polyethylene component of the solid compositions has melt index of less than 100 and generally from 0.1 to 50 and preferably 0.5 to 10 grams per 10 minutes. It has been found that the polyethylene having a melt index greater than 100 is undesirable since such does not impart the desired slow solubility to the solid composition at high temperatures. Exemplary polyethylenes useful in the practice of this invention are listed below in Table I.

TABLE I

| Trademark | Supplier | Melt Index (grams/10 minutes) |
|---|---|---|
| Elvax 1820 | E. I. du Pont de Nemours & Co. | 11 |
| Petrothene LC943 | U.S. Industrial Chemicals Co. | 0.4 |
| Petrothene LB830 | do | 0.15 |
| Petrothene LB600 | do | 1.0 |
| Petrothene LB861 | do | 1.6 |
| Petrothene 502 | do | 4–14 |

A particularly preferred polyethylene for use in the compositions of this invention is a polyethylene having a melt index of about 0.15 per grams per 10 minutes.

The copolymer component is a copolymer of ethylene and vinyl acetate containing from 15 to 30 weight percent of vinyl acetate and preferably from about 17 to 19 weight percent of vinyl acetate. It has been found that copolymers containing more than about 30 weight percent vinyl acetate are undesirable as they tend to separate from the molten blend, and that particular compositions prepared from copolymers containing less than 15 weight percent vinyl acetate are not sufficiently soluble in oil. The ethylene-vinyl acetate copolymers which can be employed herein generally exhibit a melt index between about 1 to 500 grams per 10 minutes and good results can be obtained with copolymers having a melt index between about 1 and 50 grams per 10 minutes, and more preferably between about 2 and 5 grams per 10 minutes. Exemplary ethylene-vinyl acetate copolymers useful in the practice of this invention are listed in Table II.

TABLE II

| Trademark | Supplier | Melt Index Grams/10 Minutes | Vinyl Acetate Content, Wt. Percent |
| --- | --- | --- | --- |
| Elvax 210 | E. I. du Pont de Nemours & Co. | 335–465 | 27–29 |
| Elvax 260 | " | 5–7 | 27–29 |
| Elvax 310 | " | 335–465 | 24–26 |
| Elvax 350 | " | 16–22 | 24–26 |
| Elvax 360 | " | 1.6–2.4 | 24–26 |
| Elvax 420 | " | 125–175 | 17–19 |
| Elvax 460 | " | 2.1–2.9 | 17–19 |

A particularly preferred copolymer for use in compositions of this invention is an ethylene-vinyl acetate copolymer that contains 17–19 weight percent of vinyl acetate and exhibits a melt index of about 2 to 3 grams per 10 minutes. A commercial ethylene-vinyl acetate copolymer exemplary of this preferred copolymer is marketed by E. I. du Pont de Nemours & Company, Wilmington, Del. under the trademark Elvax 460.

Another preferred copolymer is an ethylene-vinyl acetate copolymer that contains about 24 to 26 weight percent of vinyl acetate and exhibits a melt index of about 1 to 3 grams per 10 minutes. A commercial ethylene-vinyl acetate copolymer exemplary of this copolymer is also marketed by E. I. du Pont de Nemours & Company under the trademark Elvax 360.

The term "melt index" as employed herein is the flow rate reported as a rate of extrusion in grams per 10 minutes as determined by ASTM Test Method D 1238-65T entitled, "Measuring Flow Rates of Thermoplastics by Extrusion Plastometer" and performed under Standard Test Condition E, ASTM Standards, American Society for Testing Materials, Part 27, June 1969, 455–466, which procedure is incorporated herein by reference.

The polyamide components having melting points of between about 400° F. and 460° F. and are of the formula:

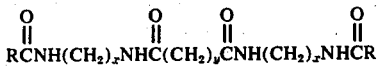

where R is an alkyl group containing from 15 to 18 carbon atoms, $x$ is an integer from 2 to 4, and $y$ is an integer from 4 to 10.

A preferred polyamide used in the compositions of this invention is N,N'-bis(2-stearamidoethyl) sebacamide having the formula:

and which exhibits a melting point between about 400° F. and 448° F. A commercial product exemplary of these polyamide compounds is marketed by the Carlisle Chemical Works, Inc., Cincinnati, Ohio, under the trademark Carlisle 450 Wax.

Softening agents are added to the above components to improve processability during manufacture. These softening agents must be compatible with the other components of the composition of this invention to produce a homogeneous product without adversely affecting the high temperature solubility characteristic of the overall composition. Generally, softening agents are long chain aliphatic hydrocarbon diamides having a melting point in the range of between about 280° F. and 300° F. characterized by the formula:

where R' is an alkyl group containing from about 15 to 17 carbon atoms and R" is an alkylene group containing from 2 to 4 carbon atoms. A preferred compound is N,N'-distearoyl ethylene diamine having a melting point in the range of between about 289° and 294° F. and which is characterized by the formula:

Commercial products exemplary of these agents are marketed by the Carlisle Chemical Works, Inc., Cincinnati, Ohio, under the trademark Carlisle Wax 290.

Polyterpene resins are also suitable softening agents in the compositions of this invention. The polyterpene resins are obtained by polymerizing unsaturated terpenes to obtain an amorphous thermoplastic, acidic resin. One group of polyterpenes essentially comprises polymerized beta-pinene, while another group essentially comprises polymerized alpha-pinene. Such polymers have melting points from about 50° F. to about 275° F. The lower melting resins are unsuitable for use in this invention since they are liquids at ambient temperatures or melt under bottom bottom-hole conditions causing too rapid dispersion of the solid composition. The higher melting point resins, having melting points between about 230° F. and 275° F., are preferred for use in this invention. Commercial polyterpene resins exemplary of these preferred terpene resins are marketed by Pennsylvania Industrial Chemical Corporation, Clarion, Pa., under the trademarks Piccolyte S115 and Piccolyte S125.

The compositions of this invention are readily prepared by melting the individual components and then admixing the molten liquids in the proper proportions. Alternatively, the solid ingredients can be combined in the proper proportion and then melted to obtain a homogeneous liquid mixture. In either case, the proportion of each component is selected to impart the desired properties to the final solidified product. A particularly preferred particulate composition comprises solid particles of a homogeneous mixture of (1) about 8 to 12 weight percent of an ethylene-vinyl acetate copolymer having from about 17 to 19 weight percent of vinyl acetate and exhibiting a melt index of about 2 to 3 grams per 10 minutes, (2) about 40 to 50 weight percent of N,N'-bis(2-stearamidoethyl) sebacamide, and (3) about 40 to 50 weight percent of a polyterpene resin having a melting point of about 240° F. Another preferred composition comprises solid particles of a homogeneous mixture of (1) about 12 to 16 weight percent of an ethylene-vinyl acetate copolymer having 17 to 19 weight percent of vinyl acetate and exhibiting a melt index of about 2 to 3 grams per 10 minutes, (2) about 12 to 18 weight percent of N,N'-bis(2-stearamidoethyl) sebacamide, and (3) about 60 to 70 weight percent of N,N'-distearoyl ethylene diamine. Still another preferred composition comprises solid particles of a homogeneous mixture of (1) about 15 to 25 weight percent of an ethylene-vinyl acetate copolymer having from 17 to 19 weight percent of vinyl acetate and exhibiting a melt index of about 2 to 3 grams per 10 minutes, (2) about 8 to 15 weight percent of N,N'-bis(2-stearamidoethyl) sebacamide, and (3) about 60 to 70 weight percent of N,N'-distearoyl ethylene diamine. Still another preferred composition comprises solid particles of a homogeneous mixture of (1) about 12 to 16 weight percent of an ethylene-vinyl acetate copolymer having 17 to 19 weight percent of vinyl acetate and exhibiting a melt index of about 2 to 3 grams per 10 minutes, (2) about 19 to 22 weight percent of N,N'-di(2-stearamidoethyl) sebacamide, and (3) about 60 to 70 weight percent of N,N'-distearoyl ethylene diamine.

The solid particles used in the practice of this invention vary widely in size and shape. Typically, these particles can be spheroids, cubes, granules, buttons, flat discs, or mixtures thereof, having mean diameters in the range of about ½ inch to about 1 micron and less. More particularly, the particles can be cubes, buttons, or discs having mean diameters from about ⅛ inch to about ½ inch, spheroids or granules in the size range from about 4 to 200 mesh U.S. Standard screen, or particles having mean diameters of from about 1 to 50 microns.

The compositions of this invention are useful in treating high temperature subterranean formations having temperatures above about 350° F. In its broadest application the process comprises contacting a subterranean formation penetrated by a well with a suspension of solid particles of the aforesaid composition in a suitable carrier liquid injected into the well. This treatment can comprise a single temporary and selective plugging, or it can be an integral part of a comprehensive fracturing, well drilling, acidizing, or solvent treating process. Also, the particulate composition of this invention can be effectively used as a low fluid loss agent in a drilling fluid employed in well drilling and particularly as a low fluid loss agent in completion fluids employed in the drilling of oil and gas wells. In drilling and workover applications, the drilling fluid is circulated from the surface to the drilling zone in a high temperature formation during the drilling operation, and at least a portion of the fluid is returned to the surface. The particulate compositions of this invention can be incorporated in the fracturing fluids employed in hydraulically fracturing an earth formation surrounding the well, and the composition can be employed in chemical treating, acidizing and other well treating operations wherein it is desired to control the fluid loss to permeable underground structures.

The particle sizes selected for a pre-fracturing plugging step will depend on the expected nature and structure of the formation and the type of liner or casing employed. Typically, a particle size within the range passing a number 6 U.S. Standard sieve and being retained on a number 100 U.S. Standard sieve is used for plugging, and preferably a size within the range passing a number 6 and being retained on a number of 20 U.S. Standard sieve. Injection of the plugging agent may be made as a suspension in a liquid containing up to about 12 pounds of solid particles per gallon of fluid. In the suspension above about 12 pounds of solids, the solids become the continuous phase and the system loses its fluid characteristics. A preferred plugging agent suspension for pre-plugging prior to hydraulically fracturing comprises a suspension of between about 4 and about 8 pounds of particles per gallon of liquid.

A highly satisfactory general purpose plugging agent comprises a suspension of solid substantially spherical-shaped particles of the aforesaid composition, the particles having a size distribution wherein between about 30 to 50 weight percent of the particles are within the size range passing a number 6 and being retained on a number 20 U.S. Standard sieve, between about 10 and about 20 weight percent of the particles are within the size range passing a number 20 and being retained on a number 40 U.S. Standard sieve, between about 20 to 30 weight percent of the particles are within the size range passing a number 40 and being retained on a number 60 U.S. Standard sieve, and between about 10 and about 20 weight percent of the particles are within the size range passing a number 60 and being retained on a number 100 U.S. Standard sieve.

The particulate compositions of this invention can be more readily dispersed into a liquid carrier by the addition of a small amount of a surface active agent to the carrier fluid. Also, small amounts of surface active agents, or a mixture of surface active agents, can be added to the dispersion to enhance the fluid loss properties of the particles. Furthermore, other types of fluid retarding agents such as viscosity increasing agents, solid inorganic particles, and the like, can be incorporated into the suspension of plugging particles, and the use of such agents in combination with the plugging particles is included within the scope of this invention.

The invention is further illustrated by the following examples which are illustrative of specific modes of practicing the invention and are not intended as limiting the scope of the invention as defined by the appended claims.

EXAMPLES 1–15

In each example a homogeneous solid composition is prepared by blending a stated proportion of an ethylene-vinyl acetate copolymer, a polyamide and a softening agent in their molten states. Droplets of the molten compositions are solidified to form homogeneous solid particles. These homogeneous solid compositions are tested for oil solubility and hardness properties.

The ethylene-vinyl acetate copolymer used in these examples contains from about 17 to 19 weight percent of vinyl acetate and exhibits a melt index of about 2.1 to 2.9 grams per 10 minutes. The polyamide component is N,N'-di(2-stearamidoethyl) sebacamide having a melting point of between 400° F. and 448° F. The compositions and test results are reported in Table III. Various long chain aliphatic diamides and polyterpene resins are employed as the softening agent.

The spatula test is a preliminary screening test for hardness and is conducted in the following manner. The blended composition is cast and molded into ½-inch × ½-inch × 4-inch test specimens. The specimens are then placed in an oven maintained at 350° F. and heated for 15 minutes. While the specimens are still in the oven, a hot spatula, preheated at 350° F., is used to attempt to penetrate the surface of the test sample. The test results are designated soft for deep penetration, moderate for penetration with force, and hard for specimens which are difficult to penetrate with force. Only specimens which were rated at least medium-hard were considered for further testing in the Ball Hardness Test.

The Ball Hardness Test provides a more quantitative measure of the hardness of the test specimens. The Ball Hardness Number is defined as the ratio of the load in kilograms to the area in square centimeters of the spherical surface of the indentation $$BHN = \frac{200\,P}{\pi D(D - \sqrt{D^2 - d^2})}$$

where:
$P$ = load in kilograms
$D$ = Ball diameter = 9.250 mm.
$d$ = dent diameter in mm.
$\pi$ = 3.1416

The Ball Hardness Number is calculated from the diameter of the impression made in the cast surface of the sample by a hardened steel ball under a given load for 30 seconds. Hard specimens yield high values; soft specimens yield low values. The BHN values are reported in Kg/cm$^2$ and test temperatures in degrees Fahrenheit.

The apparatus consists of a ball assembly of a ⅜ inch (9.520 mm) diameter hardened steel ball affixed to one end of a ⅜-inch diameter aluminum rod, 8 ¼-inches long. A circular aluminum plate 2 inches in diameter and 5/16-inch thick is affixed to the other end of the rod on which additional weights may be placed. The ball assembly is adjustable and extends through a fixed cylindrical orifice with a locking device.

The procedure involves heating a representative portion of the composition to a temperature approximately 40° F. above its melting point. A brass ring, 5/16-inch high, 1 ¼-inch outer diameter, and having an inner surface tapered from 1-inch inner diameter at one end to 1 ⅛-inch inner diameter at the other end, is placed on a smooth metal plate. The molten composition is poured into the mold until the meniscus rises above the edge of the mold. The composition remains molten for 10–20 seconds. The specimen is cooled at room temperature until firm and then the mold is separated from the smooth metal plate. The specimens and the apparatus are placed in an oven maintained at the test temperature and heated for at least 15 minutes. The ball assembly which weighs 100 grams is placed on the smooth cast surface of the specimen, locked in position, then released for 30±5 seconds and then raised. The indented specimen is removed from the oven and cooled at room temperature. The diameter of the indentation is read with a calibrated microscope to 0.1mm and estimated to 0.05mm. The hardness of the acceptable material has a Ball Hardness Number of at least about 2.0 at 280° F.

The oil solubilities of the solid compositions are determined by placing four approximately 3/16-inch diameter particles of the compositions to be tested in each of three 6-dram vials filled with a solvent comprised of 70 volume percent kerosene and 30 volume percent of 90 neutral oil (a paraffinic lubricating oil having a viscosity of about 90 SUS at 100° F.). One of the vials is placed in each of three ovens maintained at temperatures of 300°, 325° and 350° F., respectively, and rotated therein at about 16 r.p.m. for a 18 hour contacting period. After 18 hours of the contacting period, the vials are temporarily removed from the ovens and their contents separately poured over four 100-mesh U.S. Standard sieve screens and each screen visually examined to determine the amount of solid particles remaining undissolved. The solvent and the solid particles are replaced in the vials and the vials returned to the ovens and rotated therein for another 18 hour contacting period (36 hours comulative). At the end of another 18 hour contacting period (54 hours cumulative), the contents of the vials are again separately poured over 100-mesh U.S. Standard sieve screens and the amount of undissolved particles determined. This procedure was repeated at the end of another 18 hour contacting period (72 hours cumulative).

The solid compositions which are less than 50 volume percent dissolved in the solvent after 18 hours and more than 50 volume percent dissolved after 36 hours, or which exhibit a solubility difference of at least 50 volume percent upon contacting the solvent during the time span between 18 and 72 hours at the contacting temperature, are considered to possess the desired delayed oil solubility for purposes of this invention, and are deemed satisfactory. The solid compositions that are more than 50 volume percent dissolved after 18 hours and those compositions that are less than 50 volume percent dissolved after 36 hours or exhibit a solubility difference of less than 50 volume percent upon contacting the solvent during the 72 hours of the contacting period do not possess the desired delayed oil solubility and are unsatisfactory.

TABLE III

| Example | Composition Weight Percent | | | Solubility Test-350° F Volume Percent | | | | Spatula Test | Ball Hardness Test | |
| | E-VAc Polymer | Poly-amide | Softening Agent | 18 Hrs. | 36 Hrs. | 54 Hrs. | 72 Hrs. | 350° F | 280° F | 300° F |
| --- | --- | --- | --- | --- | --- | --- | --- | --- | --- | --- |
| 1 | 0 | 50 | 50 290 Wax[1] | 10 | 10 | 50 | 50 | Soft | — | — |
| 2 | 10 | 45 | 45 S-115[2] | 10 | 10 | 70 | 70 | Hard | 2.0 | 1.38 |
| 3 | 10 | 60 | 30 AB-180[3] | 10 | 15 | 70 | 85 | Medium-Hard | 2.0 | Sticky |
| 4 | 10 | 10 | 80 AB-180 | 10 | 100 | — | — | Medium-Hard | Sticky | — |
| 5 | 10 | 10 | 80 290 Wax | 10 | 15 | 30 | 60 | Soft | — | — |
| 6 | 10 | 6 | 84 290 Wax | 10 | 15 | 30 | 60 | Soft | — | — |
| 7 | 10 | 30 | 60 AB-180 | 10 | 50 | 75 | 80 | Medium-Hard | Sticky | — |
| 8 | 14 | 16 | 70 290 Wax | 25 | 100 | — | — | Hard | 2.0 | 2.0 (Hard) |
| 9 | 14 | 10 | 76 H-2[4] | 10 | 100 | — | — | Soft | — | — |
| 10 | 14 | 10 | 76 S-115 | 10 | 100 | — | — | Soft | — | — |
| 11 | 14 | 10 | 76 290 Wax | 10 | 15 | 50 | 50 | Soft | — | — |
| 12 | 14 | 20 | 70 AB-180 | 10 | 100 | — | — | Medium-Hard | 2.0 (less than) | — |
| 13 | 20 | 10 | 70 290 Wax | 40 | 80 | — | 100 | Medium-Hard | 2.0 | 2.0+ |
| 14 | 14 | 30 | 54 AB-180 | 75 | 80 | 95 | 100 | Medium-Hard | 1.29 | Sticky |

TABLE III-continued

| Example | Composition Weight Percent | | | Solubility Test-350° F Volume Percent | | | | Spatula Test | Ball Hardness Test | |
|---|---|---|---|---|---|---|---|---|---|---|
| | E-VAc Polymer | Poly- amide | Softening Agent | 18 Hrs. | 36 Hrs. | 54 Hrs. | 72 Hrs. | 350° F | 280° F | 300° F |
| 15 | 14 | 20 | 66 290 Wax | 20 | 100 | — | — | Hard | 2.0 | 2.0 (Hard) |

[1] Carlisle 290 Wax Carlisle Chemical Works, Inc. Bis-stearoylamide 290° F m.p.
[2] Piccolyte S-115 Pennsylvania Industrial Chem. Co. Polyterpene resin 240° F m.p.
[3] Inkovar AB-180 Pennsylvania Industrial Chem. Co. Polyterpene resin 350° F m.p.
[4] Piccopale H-2 Pennsylvania Industrial Chem. Co. Hydrogenated petroleum resin 220° F m.p.

As is apparent from the foregoing table, a specific range of polymer, polyamide and softening agent is necessary to achieve both the desired delayed oil solubility and hardness characteristics at high temperatures. The range of from about 5 to 25 weight percent of polymer, 8 to 50 weight percent of polyamide, and as a softening agent about 60 to 70 weight percent of a long chain aliphatic diamide having a melting point of between about 280° F. and 300° F. and which is characterized by the formula:

wherein R' is an alkyl group containing from 15 to 17 carbon atoms and R'' is an alkylene group containing from 2 to 4 carbon atoms, or in the alternative, from 40 to 50 weight percent of a polyterpene resin having a melting point of between about 230° F. and 275° F. provides the desired results. Only four compositions, Examples 2, 8, 14 and 15 have these desired characteristics. It is also clear from the data that compositions containing as a softening agent more than 75 weight percent of the long chain aliphatic diamide or more than 50 weight percent of a polyterpene resin having a melting point of about 240° F., or any polyterpene resin melting at 350° F., yield unsatisfactory results.

EXAMPLE 16

A particulate solid well-treating composition is prepared substantially in accordance with the composition of Example 2. About 0.1 weight percent of 2,7-ditertiarybutyl-o-cresol is added to the blend as an oxidation inhibitor.

The molten composition is then formed into discrete solid particles of the following size ranges:
1. flat buttons having a thickness of approximately 1/16-inch and a diameter of about ¼-inch to ⅜-inch;
2. particles having sizes in the range of about 8- to 100-mesh U.S. Standard screen; and
3. particles having sizes in the range from about 1 micron to 100-mesh U.S. Standard screen.

Approximately 50 percent of the particles in the 8- to 10-mesh size range have sizes in the range of 8- to 20-mesh U.S. Standard screen and about 50 percent having sizes in the range of 20- to 100-mesh.

Any size is suitable for use as a diverting agent in well drilling and treating operations. Generally the size employed is dependent on the porosity and permeability of the geological formation.

EXAMPLE 17

This example illustrates the use of the method and composition of this invention in treating a high-temperature, subterranean oil-containing reservoir to stimulate the recovery of oil therefrom. The well is completed in a relatively deep reservoir having a temperature of 345° to 360° F., with a total productive interval of about 400 feet perforated with two holes per foot at the depths of 17,100 to 17,300 feet and 17,300 to 17,500 feet.

The stimulation treatment as performed by injecting 3000 gallons of 15 percent hydrochloric acid into the well, then introducing 12 pounds of particulate diverting agent, and then injecting another 3000 gallons of acid. The diverting agent comprises flat buttons approximately ¼-inch to ¾-inch in diameter of the slowly oil-soluble, water-insoluble homogeneous solid composition prepared in accordance with Example 16. An initial slug of the acid is injected into the well under vacuum. However, the second slug of the acid injected after treatment with the diverting agent particles is subjected to a surface pressure of 1100 p.s.i.g.

Upon completion of the acid injection, the well is flushed with lease crude and then with water, and the well returned to production. The production rate of oil is observed and found to be substantially higher than the rate prior to the stimulation treatment, which indicates that the stimulation treatment is successful and the diverting agent particles are substantially removed from the oil producing zones.

EXAMPLE 18

This example illustrates the use of the method and composition of this invention in fracturing a high-temperature, subterranean oil-producing formation. A production well is completed in the reservoir having a temperature of 345° to 352° F., with a total productive interval of 352 feet perforated with two holes per foot at the depths of 17,205 and 17,357 feet and 17,412 to 17,612 feet.

Fracturing is accomplished by injecting 10,000 lbs. of 20 to 40 mesh sand and 10,000 gallons of gelled brine into the well at a volume rate and pressure sufficient to fracture the formation. After approximately one-half of the fracturing fluid is injected, 10 pounds of diverting agent particles are slugged into the well and the fracturing fluid injection continued. The diverting agent comprises flat buttons approximately ¼-inch to ⅜-inch in diameter of the slowly oil-soluble, water-insoluble homogeneous solid composition described in Example 16. The initial portion of the fracturing fluid is injected at a surface pressure of 800 p.s.i.g. However, the injection pressure is increased to 1,300 p.s.i.g. after treatment with the diverting agent.

Upon completion of the fracturing operation, the well is flushed with lease crude and returned to production. The production rate of the oil is observed and found to be substantially higher than the rate prior to fracturing, which indicates that fracturing operation is successful and the diverting agent particles are substantially removed from the oil-producing zones.

EXAMPLE 19

This example illustrates the use of the method and composition of this invention in drilling a well into a high temperature formation having a temperature of 345° to 352° F. This well had previously been drilled to a depth of 17,500 feet and then plugged to a depth of 17,425 feet with pea gravel and cement. For a number of years the well was produced from a productive interval from 17,100 to 17,425 feet, however, it is now desired to open the lower zones to production.

The plug is drilled out using a 3 ¾-inch-diameter bit on a conventional drill string. Brine is used as drilling fluid, and is circulated from the surface to the drilling zone and returned to the surface. The well is drilled from 17,450 feet to 17,610 feet with lost circulation to the formation at 17,551 feet. Approximately 750 lbs. of diverting agent particles are added to a gelled brine and the drilling resumed using this material as the drilling fluid. The diverting agent comprises particles of the slowly oil-soluble, water-insoluble homogeneous solid composition described in Example 16, having sizes in the range of 8 to 100-mesh U.S. Standard screen with approximately 50% of the particles having sizes in the range of 20-mesh and 50% having sizes in the range of 20 to 100-mesh. After addition of the diverting agent, good fluid circulation is observed. Drilling is continued to a depth of 17,610 feet without further difficulty.

The gelled brine is displaced from the well with ungelled brine, and again the formation did not take fluid. Then, 14 barrels of lease crude is placed in the well and allowed to stand overnight. After the oil soak it is observed the formation is open and readily capable of taking fluid.

While particular embodiments of the invention have been described, it will be understood, of course, that the invention is not limited thereto since many obvious modifications can be made, and it is intended to include within this invention any such modifications as will fall within the scope of the claims.

The invention having thus been described we claim:

1. A method of treating high temperature subterranean formations having temperatures above about 350° F. penetrated by a well comprising injecting through said well and into contact with said formation a liquid having suspended therein discrete slowly oil-soluble, water-insoluble solid particles having a mean diameter of from about ½ inch to about 1 micron comprised of a homogeneous mixture of (1) about 5 to 25 weight percent of a polymer selected from the group consisting of polyethylene having a melt index of less than 100 grams in 10 minutes, ethylene-vinyl acetate copolymer containing from 15 to 30 weight percent of vinyl acetate having a melt index of from about 1 to about 500 grams per 10 minutes, and admixtures of said polymers; (2) about 8 to 50 weight percent of a polyamide having a melting point between about 400° F. and 460° F. characterized by the formula:

wherein R is an alkyl radical containing from 15 to 18 carbon atoms, x is an integer from 2 to 4, and y is an integer from 4 to 10; and (3) about 40 to 50 weight percent of a polyterpene resin having a melting point between about 230° F. and 275° F. or about 60 to 70 weight percent of an aliphatic diamide having a melting point between about 280° F. and 300° F. characterized by the formula:

wherein R' is an alkyl radical containing from 15 to 18 carbon atoms and R'' is an alkylene radical containing from 2 to 4 carbon atoms.

2. The method as defined in claim 1 wherein said ethylene-vinyl acetate copolymer contains 17 to 19 weight percent vinyl acetate and exhibits a melt index of about 2 to 3 grams per 10 minutes.

3. The method as defined in claim 1 wherein the concentration of said solid particles is between about 4 and about 8 pounds of particles per gallon of liquid.

4. The method as defined in claim 1 wherein said solid particles are of the following size distribution:

| U.S. Standard sieve, size | Weight Percent |
|---|---|
| 6-20 | about 30 to about 50 |
| 20-40 | about 10 to about 20 |
| 40-60 | about 20 to about 30 |
| 60-100 | about 10 to about 20 |

5. The method as defined in claim 1 wherein said softening agent is a long chain aliphatic diamide having a melting point about 290° F. of the formula:

wherein R' is an alkyl group containing from 15 to 18 carbon atoms and R'' is an alkylene group containing from 2 to 4 carbon atoms.

6. The method as defined in claim 1 wherein said softening agent is a polyterpene resin having a melting point between about 230° and 275° F.

7. A method of completing a well bore drilled into a subterranean formation comprising circulating a completion fluid from the surface to the drilling zone in said formation during the drilling operation and returning to the surface at least a portion of said completion fluid, said completion fluid comprising a pumpable carrier medium having suspended therein particles having a mean diameter of from about ½ inch to about 1 micron of a homogeneous solid mixture comprising (1) about 5 to 25 weight percent of a polymer selected from the group consisting of polyethylene having a melt index of less than 100 grams in 10 minutes, ethylene-vinyl acetate copolymer containing about 15 to 30 weight percent of vinyl acetate having a melt index of from about 1 to about 500 grams per 10 minutes, and admixtures of said polymers; (2) about 8 to 50 weight percent of a polyamide having a melting point between about 400° F. and 460° F. characterized by the formula:

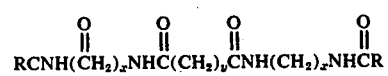

wherein R is an alkyl radical containing from 15 to 18 carbon atoms, x is an integer from 2 to 4, and y is an integer from 4 to 10; and (3) about 40 to 50 weight percent of a polyterpene resin having a melting point between about 230° F. and 275° F. or about 60 to 70 weight percent of an aliphatic diamide having a melting point between about 280° F. and 300° F. characterized by the formula:

wherein R' is an alkyl radical containing from 15 to 18 carbon atoms and R'' is an alkylene radical containing from 2 to 4 carbon atoms.

8. A method of producing fractures in a subterranean formation penetrated by a well bore comprising injecting a fracturing fluid into said well bore at a pressure and volume flow rate sufficient to produce a fracture in said formation, said fracturing fluid having suspended therein particles having a mean diameter of from about ½ inch to about 1 micron of a homogeneous solid mixture comprising (1) about 5 to 25 weight percent of a polymer selected from the group consisting of polyethylene having a melt index of less than 100 grams in 10 minutes, ethylene-vinyl acetate copolymer containing about 15 to 30 weight percent of vinyl acetate having a melt index of from about 1 to about 500 grams per 10 minutes, and admixtures of said polymers; (2) about 8 to 50 weight percent of a polyamide having a melting point between about 400° F. and 460° F. characterized by the formula:

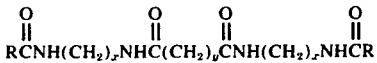

wherein R is an alkyl radical containing from 15 to 18 carbon atoms, $x$ is an integer from 2 to 4, and $y$ is an integer from 4 to 10; and (3) about 40 to 50 weight percent of a polyterpene resin having a melting point between about 230° F. and 275° F. or about 60 to 70 weight percent of an aliphatic diamide having a melting point between about 280° and 300° F. characterized by the formula:

wherein R' is an alkyl radical containing from 15 to 18 carbon atoms and R'' is an alkylene radical containing from 2 to 4 carbon atoms.

* * * * *